US006449842B1

(12) United States Patent
Yancer

(10) Patent No.: US 6,449,842 B1
(45) Date of Patent: Sep. 17, 2002

(54) POWDER FOR PISTON-RING INSTALLATION

(75) Inventor: C. William Yancer, Maricopa, AZ (US)

(73) Assignee: Total Seal, Inc., Phoenix, AZ (US)

( * ) Notice: Subject to any disclaimer, the term of this patent is extended or adjusted under 35 U.S.C. 154(b) by 0 days.

(21) Appl. No.: 09/678,176

(22) Filed: Sep. 28, 2000

(51) Int. Cl.$^{7}$ ................................................ B23P 15/00

(52) U.S. Cl. ............................. 29/888.061; 29/888.06; 29/888.011

(58) Field of Search ....................... 29/888.061, 888.06, 29/888.011; 123/192.3, 193.2

(56) References Cited

U.S. PATENT DOCUMENTS 3,882,584 A * 5/1975 Tsuya
5,102,566 A * 4/1992 Fetterman, Jr. et al.
5,141,657 A * 8/1992 Fetterman, Jr. et al.
5,358,753 A * 10/1994 Rao et al. .............. 29/888.061
5,501,190 A * 3/1996 Okubo et al. ........... 123/196 R
5,566,450 A * 10/1996 Rao et al. ................ 29/888.06
5,666,725 A * 9/1997 Ward ..................... 29/888.011
5,815,789 A * 9/1998 Akpan
5,842,109 A * 11/1998 Akpan et al.
5,934,239 A * 8/1999 Koriyama ................ 123/192.3
6,095,107 A * 8/2000 Kloft et al. .............. 123/193.2
6,217,295 B1 * 4/2001 Kato et al. .................... 92/155
6,289,872 B1 * 9/2001 Dardalis ................ 123/190.12

OTHER PUBLICATIONS

Techline Coatings, Inc., Website at TechlineCoatings.com, Jun. 14, 2000.*

* cited by examiner

*Primary Examiner*—I. Cuda-Rosenbaum
(74) *Attorney, Agent, or Firm*—Meschkow & Gresham PLC

(57) ABSTRACT

A process (30) is presented for the post-honing cleaning and lubrication of a cylinder (24) of a reciprocating engine (22) prior to assembly thereof. The process (30) includes cleaning (32) the cylinder (24) with a water-and-wetting-agent solution and with a solvent in an effort to remove contaminants. The process (30) also includes lubricating (40) the cylinder (24) with a penetrating oil, and coating (42) the cylinder (24) with an indicating lubricant (28) formed of a powdered mixture of tungsten disulfide and graphite. The indicating lubricant (28) is configured to change color to assume a specific tint when contaminants have been substantially removed from the cylinder (24), and to refrain from assuming that tint when contaminants have not been substantially removed from the cylinder (24). The process (30) includes repeating the cleaning (32), lubricating (40), and coating (42) activities when the indicating lubricant (28) has refrained from assuming that tint, and allowing (48) assembly of the engine (22) to proceed when the indicating lubricant (28) has assumed that tint.

21 Claims, 1 Drawing Sheet

POWDER FOR PISTON-RING INSTALLATION

TECHNICAL FIELD OF THE INVENTION

The present invention relates to methods of post-honing reciprocating-engine cylinder preparation. More specifically, the present invention relates to the use of cylinder lubricants incorporating cleanliness indicators in connection with post-honing engine assembly methods.

BACKGROUND OF THE INVENTION

In the manufacture or remanufacture of reciprocating engines, it is typically necessary to bore and/or hone the engine cylinders. The processes of boring and/or honing a cylinder leave a fine contaminant residue. This residue and other contaminants (e.g., soil, dust, and corrosion particles) must be removed prior to engine assembly. A failure to remove these contaminants will result in excessive initial engine wear, shortening the overall performance life of the engine and, in some cases, posing a risk of catastrophic failure.

These boring and/or honing processes are often performed in a modest service or customization facility. Such facilities typically lack the elaborate (and expensive) cleaning instrumentality of a production-engine manufacturing facility. Adequate pre-assembly cleaning is therefore typically more of a problem for the modest service or customization facility than the production facility.

The very processes of boring and/or honing a cylinder produce process debris. This debris is typically made up of a mixture of particulate matters removed from the inner surface of the cylinder mixed and from the boring and/or honing tool, i.e., of bits of cylinder and bits of abrasive. A portion of this debris embeds itself into the inner surface of the cylinder. This embedded debris is not easily removed from the cylinder. A cylinder may be made visually clean (i.e., the cylinder contains no contaminants visible to the naked eye) and wiping clean (i.e., a white cloth used to wipe the cylinder shows no visible contaminants) without being substantially free of contaminants.

To prevent excessive wear and associated problems during engine run-in, therefore, the cylinders should be adequately cleaned prior to running the engine. A cylinder is adequately cleaned when the cleaning process has removed substantially all the contaminants upon or in the inner surface of the cylinder.

Additionally, since a reciprocating engine must already be running before its oil distribution system can lubricate the cylinders, there is a short period of "dry" operation during run-in, i.e., when an engine is placed into operation for the first time after boring and/or honing of the cylinders. Therefore, to prevent excessive wear and associated problems during engine run-in, the cylinders should be lubricated prior to running the engine.

A wet initial lubrication, e.g., a coating of oil, may have a tendency to attract dirt, dust, and other contaminants during engine assembly. For this reason alone, a wet lubrication is often undesirable.

Typical lubricating oil (e.g., crankcase oil) is a surface lubricant. That is, it has a relatively large molecule and lubricates by clinging to the surfaces of the parts, therefore providing a barrier to part-to-part contact. In a cylinder, where piston rings wipe the surface at each stroke, such a surface lubricant must constantly be replaced. This is a task of the engine's lubrication system.

When such a typical lubricating oil is used to provide a wet initial lubrication, the first stroke of the piston (i.e., of the piston rings) wipes such a lubricant out of the cylinder. This leaves the cylinder dry until the oil distribution system can distribute oil to the cylinder. While short, this period of dry run-in may produce excessive wear and associated problems.

Since the inner surface of a cylinder will normally be inadequately lubricated during engine run-in, the cylinder will rapidly heat. This heating will expand the pores in the cylinder walls and release embedded contaminants therefrom if the cylinder was not adequately cleaned prior to assembly and run-in. These contaminants, made up mainly of honing debris (i.e., bits of cylinder material and bits of honing-tool abrasive) will contribute markedly to run-in wear and associated problems of the engine, possibly even catastrophic failure thereof.

To prevent excessive wear and associated problems during engine run-in, therefore, the cylinders should be both adequately cleaned and lubricated prior to running the engine. A cylinder is adequately lubricated when a penetrating lubricant is uniformly applied to the entirety of the inner surface of the cylinder. This penetrating lubricant, by being penetrating, resists being easily removed by the wiping action of the piston rings.

A problem does exist in determining when a cylinder has been adequately cleaned and lubricated. As discussed above, a visual inspection of cleanliness cannot determine if a cylinder has been adequately cleaned, i.e., if substantially all contaminants have been removed from the inner surface of the cylinder. It is desirable, therefore, to have some form of chemical indicator to detect the presence or absence of contaminants in the cylinder.

Similarly, conventional penetrating lubricants are thin lubricants, i.e., has a small molecule, in order to be penetrative. Because they are thin lubricants, typical penetrating lubricants are essentially colorless when applied. This makes it difficult if not impossible to visually ascertain if such a penetrating lubricant has been uniformly applied. It is desirable, therefore, to provide a visual indicator in the penetrating lubricant to demonstrate application uniformity.

SUMMARY OF THE INVENTION

Accordingly, it is an advantage of the present invention that an improved post-honing reciprocating-engine cylinder preparation method using a powder for piston-ring installation is provided.

It is another advantage of the present invention that the cylinder preparation method provided incorporates improved cleaning of the cylinder(s) to remove substantially all contaminants from the cylinder prior to engine assembly.

It is another advantage of the present invention that the cylinder preparation method provided incorporates an indication of cylinder cleanliness prior to engine assembly.

The above and other advantages of the present invention are carried out in one form by a method for the post-honing preparation of a cylinder of a reciprocating engine prior to assembly of the engine. The cylinder is cleaned in an effort to remove contaminants therefrom. An inner surface of the cylinder is coated with an indicating lubricant configured to assume a first predetermined tint when the contaminants have been substantially removed and a second predetermined tint when the contaminants have not been substantially removed. The engine is assembled when the indicating lubricant has assumed the first predetermined tint.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
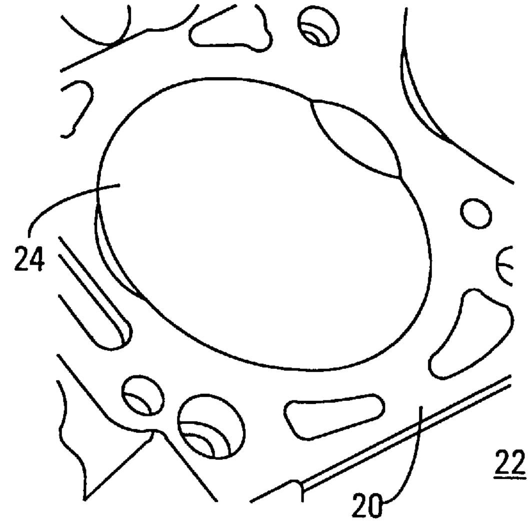
FIG. 1 shows an oblique view depicting a portion of a block of a reciprocating engine demonstrating a cylinder therein in accordance with a preferred embodiment of the present invention.
Figure 2:
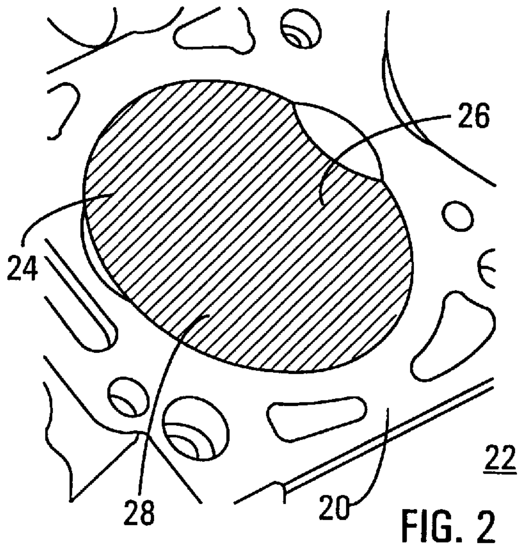
FIG. 2 shows the oblique view of FIG. 1 depicting an inner surface of the cylinder coated with an indicating lubricant in accordance with a preferred embodiment of the present invention.
Figure 3:
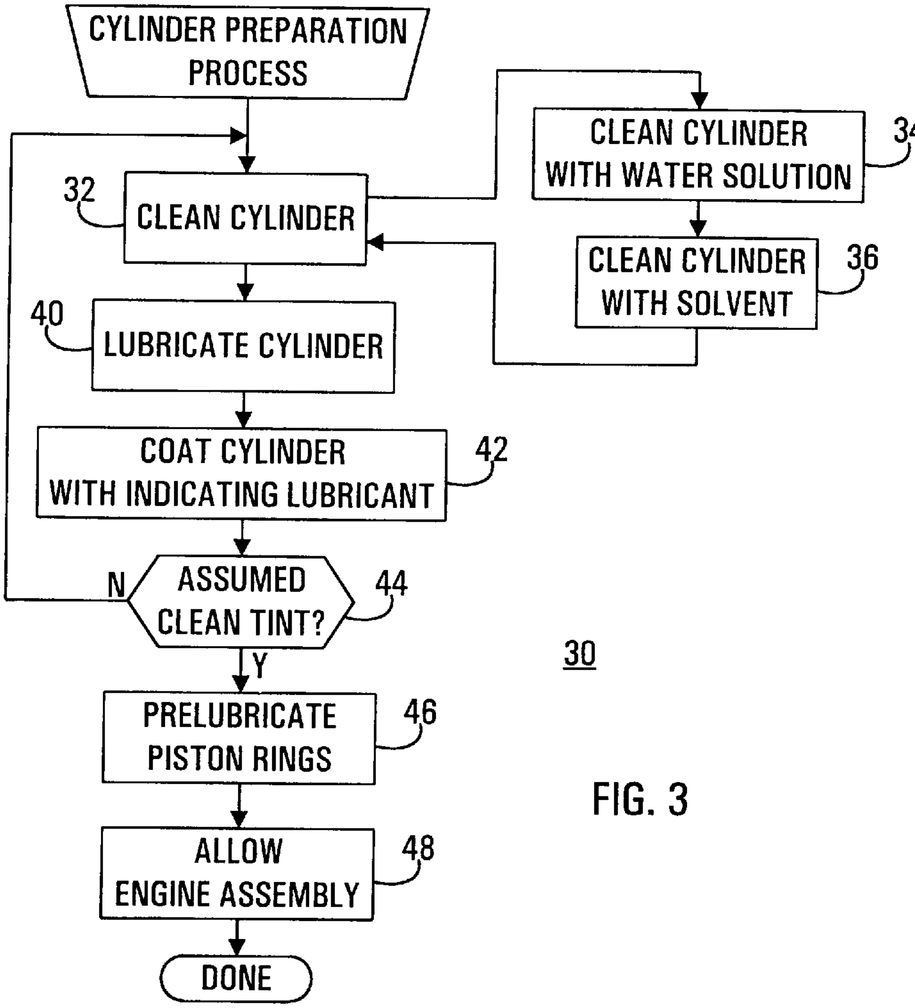
FIG. 3 shows a flow chart depicting a process for preparing a cylinder for engine assembly in accordance with a preferred embodiment of the present invention.

FIGS. 1 and 2 show oblique views depicting a portion of a block 20 of a reciprocating engine 22 demonstrating a cylinder 24 therein, with FIG. 2 depicting an inner surface 26 of cylinder 24 coated with an indicating lubricant 28 in accordance with a preferred embodiment of the present invention. FIG. 3 shows a flow chart depicting a process 30 for preparing cylinder 24 for engine assembly in accordance with a preferred embodiment of the present invention.

When reciprocating engine 22 is manufactured or remanufactured, or whenever cylinder 24 of engine 22 is bored and/or honed, it is desirable that engine 22 be cleaned and lubricated prior to assembly thereof. That is, contaminants are desirably substantially removed and a penetrating lubricant is desirably applied before engine 22 is assembled and operated. This post-boring and/or post-honing preparation of cylinder 24 for assembly of engine 22 inhibits excessive wear during run-in thereof.

In the preferred embodiment of the present invention, the cleaning and lubrication of cylinder 24 of engine 22 is desirably performed via cylinder preparation process 30. Within process 30, a task 32 cleans cylinder 24 in an effort to substantially remove contaminants therefrom. In this discussion, "contaminants" are taken to be any remaining metallic debris from the boring and/or honing of cylinder 24, any soil, any dust, any corrosion, or any other foreign matter in or upon inner surface 26 of cylinder 24.

Cleaning task 32 incorporates a subtask 34 in which cylinder 24 (i.e., block 20 of engine 22, and therefore cylinder 24 within block 20) is cleaned with a solution of water containing a wetting agent in the effort to remove the contaminants from cylinder 24. The wetting agent may be any of a plurality of soaps and/or detergents. Solution-cleaning subtask 34 serves to clean inner surface 26 of cylinder 24 of a substantial portion of contaminants.

Those skilled in the art will appreciate that, in solution-cleaning subtask 34, engine block 20 may simply be "washed with soap and water."This washing may be accomplished by immersion, by pressure spay, and/or by scrubbing. This washing may also be accomplished multiple times, may involve multiple wetting agents, and may involve a final clear rinse (i.e., a rinse with water only). These and other variations of solution-subtask 34 do not depart from the spirit of the intended invention.

Cleaning task 32 also incorporates a subtask 36 in which cylinder 24 may be further cleaned with a solvent in the effort to remove the contaminants therefrom. The solvent is desirably a volatile solvent (e.g., lacquer thinner, brake cleaner, etc.) which reacts to draw out any water and/or wetting agent residue, as well as other contaminants, thereby serving to dry as well as clean cylinder 24. Solvent-cleaning subtask 36 serves to penetrate, bring to the surface, and wash away contaminants within inner surface 26 of cylinder 24.

Solvent-cleaning subtask 36 is desirably effected through the use of an absorbent applicator at least partially saturated with the solvent. The use of such an applicator allows contaminants to be wiped away once released by the solvent. Those skilled in the art will appreciate that the absorbent applicator used for solvent-cleaning subtask 36 may be a paper towel, a shop towel, a mop applicator, or any other applicator capable of being at least partially saturated with the requisite liquid. The material of which the applicator is formed is irrelevant to its operation. This material should desirably be absorbent (e.g., can hold a sufficient quantity of the requisite liquid), non-polluting (e.g., is substantially free of lint or other contaminants), and is non-abrasive (e.g., unlikely to scratch or otherwise mar inner surface 26 of cylinder 24). The use of variant applicators and/or variant methods of effecting solvent-cleaning subtask 36 (e.g., immersion, wiping, etc.) does not depart from the spirit of the present invention.

Following cleaning task 32, process 30 performs a task 40 to lubricate inner surface 26 of cylinder 24 with a penetrating oil (e.g., ZEPRESERVE [Zep Manufacturing Co.], WD-40 [WD-40 Company], etc.). It is desirable that a penetrating oil be used to allow the lubricant to extend into inner surface 26 of cylinder 24.

Lubricating task 40 is desirably effected through the use of an absorbent applicator at least partially saturated with the penetrating oil. The use of such an applicator allows a substantially uniform coat of penetrating oil to be spread over the entirety of inner surface 26 of cylinder 24. Those skilled in the art will appreciate that the absorbent applicator of lubricating task 40 may be substantially identical to the absorbent applicator of solvent-cleaning subtask 36. The use of variant applicators and/or variant methods of effecting lubricating task 40 does not depart from the spirit of the present invention.

A task 42 then coats inner surface 26 of cylinder 24 with indicating lubricant 28. In the preferred embodiment, indicating lubricant 28 is a powder for piston-ring installation. That is, indicating lubricant 28 is a powdered lubricant that coats and penetrates inner surface 26 of cylinder 24, thereby providing a lubrication that assists in the insertion of a piston and with associated piston rings into cylinder 24 during the assembly of reciprocating engine 22, and further provides lubrication for those piston rings during engine run-in.

Desirably, indicating lubricant is a modified tungsten disulfide lubricant powder. In the preferred embodiment, graphite is the modifying agent. That is, indicating lubricant 28 is a powdered mixture of tungsten disulfide and graphite, $WS_2$+C. Both tungsten disulfide and graphite are acceptable lubricants, having low coefficients of friction.

Lubricating task 40 is desirably effected immediately prior to coating task 42. The penetrating oil of lubricating task 40 is then in position on inner surface 26 of cylinder 24, and acts as a carrier for indicating lubricant 28. As a carrier, the penetrating oil aids in the even dispersal of indicating lubricant 28 onto and into inner surface 26 of cylinder 24. That is, the penetrating oil carries indicating lubricant 28 into the pores of the metal of cylinder 24.

Those skilled in the art will appreciate that lubricating task 40 and coating task 42 may be combined into a single task if powdered indicating lubricant 28 is combined with the penetrating oil prior to application. The combining of tasks 40 and 42 does not depart from the spirit of the present invention.

The chemical properties of indicating lubricant 28 are such that indicating lubricant 28 assumes a "clean" tint uniformly over inner surface 26 of cylinder 24 when indicating lubricant 28 detects that cylinder 24 is substantially free of contaminants. That is, if cleaning task 32 (i.e., solution-cleaning subtask 34 and solvent-cleaning subtask 36) has cleaned substantially all contaminants from the entirety of inner surface 26 of cylinder 24, indicating lubricant 28 will assume the clean tint. In the preferred embodiment, the clean tint is a greenish tint different from the base tint (i.e., pre-application tint) of powdered indicating lubricant 28. In the preferred embodiment where indicating lubricant 28 is a tungsten disulfide plus graphite mixture, the base tint is a neutral gray.

Conversely, indicating lubricant 28 does not assume the clean tint (i.e., does assume a "dirty" tint) when indicating lubricant 28 detects that cylinder 24 has contaminants. That is, if cleaning task 32 (i.e., solution-cleaning subtask 34 and solvent-cleaning subtask 36) has not cleaned substantially all contaminants from inner surface 26 of cylinder 24, indicating lubricant 28 will assume the dirty tint. In the preferred embodiment, the dirty tint may be the base (grayish) tint of indicating lubricant 28, or may be a blackish or silvery tint if indicating lubricant 28 reacts with the contaminants. It is the assumption of the clean tint that differentiates powdered indicating lubricant 28 from prior art. The clean tint provides simultaneous indication of both the cleanliness of inner surface 26 of cylinder 24 and the distribution of indicating lubricant 28 over that inner surface 26. By uniformly changing from the base tint to the clean tint (i.e., exhibiting no dirty tint), indicating lubricant 28 provides visual verification that inner surface 26 of cylinder 24 has been cleaned of substantially all contaminants. Likewise, by changing to the clean tint over the entirety of inner surface 26, indicating lubricant provides visual verification that no portion of inner surface 26 has been omitted in coating task 42.

In a query task 44, process 30 determines if indicating lubricant 28 has assumed the clean tint. If query task 44 determines that indicating lubricant 28 has not assumed the clean tint (i.e., has assumed the dirty tint because contaminants were detected), then process 30 repeats cleaning task 32, lubricating task 40, and coating task 42 in an effort to remove substantially all contaminants from inner surface 26 of cylinder 24. This is repeated until query task determines that indicating lubricant 28 has assumed the clean tint.

If query task 44 determines that indicating lubricant 28 has assumed the clean tint (i.e., contaminants were not detected), then the assembly of reciprocating engine 22 may proceed.

Prior to the assembly of reciprocating engine 22, process 30 effects a task 46 in which the piston rings (not shown) to be used in cylinder 24 are prelubricated with a lightweight oil, e.g., mineral oil or SAE 10 motor oil, to facilitate insertion of the rings into cylinder 24. Task 46 is contrary to conventional practice, where the piston rings are inserted dry. It is the use of indicating lubricant 28 that makes task 46 feasible. Process 30 then effects a final task 48 allowing the assembly of reciprocating engine 22 to proceed. That is, the post-honing, pre-assembly preparation of cylinder 24 is complete.

Indicating lubricant 28, with assistance from the penetrating oil of lubricating task 40, coats inner surface 26 of cylinder 24 with a fine, penetrating lubricant suitable for engine run-in. That is, indicating lubricant 28 will remain in cylinder 24 during engine run-in, thereby significantly reducing engine wear during this critical operation.

The use of indicating lubricant 28 significantly reduces the time required for seating of the piston rings into cylinder 24 during run-in. Such seating is substantially immediate, further reducing run-in wear.

In summary, the present invention teaches a post-honing reciprocating-engine cylinder preparation process 30 using a powder for piston-ring installation. A cleaning task 32 within process 30 cleans cylinder 24 to remove substantially all contaminants therefrom. A coating task 42 within process 30 coats inner surface 26 of cylinder 24 with a powdered indicating lubricant 28. Indicating lubricant 28 provides an indication of the cleanliness of cylinder 24 prior to engine assembly. Indicating lubricant 28 also provide a penetrative and dry lubrication of cylinder 24 to aid in the installation of a piston and associated piston rings into cylinder 24 during assembly of reciprocating engine 22. Indicating lubricant 28 also aids in the inhibition of excessive wear and tear of engine 22 during run-in.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for the post-honing preparation of a cylinder of a reciprocating engine prior to assembly of said engine, said method comprising:

cleaning said cylinder in an effort to remove contaminants therefrom;

coating an inner surface of said cylinder with an indicating lubricant, wherein said indicating lubricant is configured to assume a first predetermined tint when said contaminants have been substantially removed from said cylinder, and a second predetermined tint when said contaminants have not been substantially removed from said cylinder; and allowing assembly of said engine to proceed when said indicating lubricant has assumed said first predetermined tint.

2. A cylinder preparation method as claimed in claim 1 wherein:

said indicating lubricant exhibits a third predetermined tint when first applied during said coating task, wherein said third predetermined tint is substantially different than said first predetermined tint; and said indicating lubricant assumes said first predetermined tint prior to assembly of said engine.

3. A cylinder preparation method as claimed in claim 2 wherein said third predetermined tint is substantially the same as said second predetermined tint.

4. A cylinder preparation method as claimed in claim 1 additionally comprising, prior to said allowing activity, repeating said cleaning and coating activities when said indicating lubricant has assumed said second predetermined tint.

5. A cylinder preparation method as claimed in claim 1 wherein said first predetermined tint is a greenish tint.

6. A cylinder preparation method as claimed in claim 1 wherein said second predetermined tint is one of a blackish and a silvery tint.

7. A cylinder preparation method as claimed in claim 1 wherein said cleaning activity comprises cleaning said cylinder with a solution of water containing a wetting agent in said effort to remove said contaminants from said cylinder.

8. A cylinder preparation method as claimed in claim 1 wherein said cleaning activity comprises cleaning said cylinder with an absorbent applicator at least partially saturated with a solvent in said effort to remove said contaminants from said cylinder.

9. A cylinder preparation method as claimed in claim 1 additionally comprising lubricating said cylinder with an absorbent applicator at least partially saturated with a penetrating oil.

10. A cylinder preparation method as claimed in claim 1 wherein said indicating lubricant is a powder comprising a mixture of tungsten disulfide and graphite.

11. A cylinder preparation method as claimed in claim 1 additionally comprising prelubricating piston rings for insertion into said cylinder prior to said engine assembly.

12. A cylinder preparation method as claimed in claim 1 wherein said method facilitates a substantially immediate seating of piston rings into said cylinder during engine run-in following said engine assembly.

13. In a method for the post-honing preparation of a cylinder of a reciprocating engine prior to assembly of said engine, which cylinder has been cleaned in an effort to remove contaminants therefrom, wherein the improvement comprises coating an inner surface of said cylinder with an indicating lubricant, wherein said indicating lubricant is configured to assume a first predetermined tint when said contaminants have been substantially removed from said cylinder, and a second predetermined tint when said contaminants have not been substantially removed from said cylinder.

14. A cylinder preparation method as claimed in claim 13 wherein, when said indicating lubricant assumes said second predetermined tint, said method additionally comprises:

cleaning said cylinder in an additional effort to remove said contaminants therefrom; and recoating said cylinder with said indicating lubricant.

15. A cylinder preparation method as claimed in claim 14 wherein, when said indicating lubricant again assumes said second predetermined tint, said method additionally comprises repeating said cleaning and recoating activities until said indicating lubricant assumes said first predetermined tint.

16. A cylinder preparation method as claimed in claim 13 additionally comprising allowing assembly of said engine to proceed when said indicating lubricant has assumed said first predetermined tint.

17. A cylinder preparation method as claimed in claim 13 wherein said first predetermined tint is a greenish tint.

18. A cylinder preparation method as claimed in claim 13 wherein said second predetermined tint is one of a blackish and a silvery tint.

19. A cylinder preparation method as claimed in claim 13 additionally comprising lubricating said cylinder inner surface with a penetrating oil prior to said coating activity.

20. A cylinder preparation method as claimed in claim 13 wherein said indicating lubricant is a powder formed of a mixture of tungsten disulfide and graphite.

21. A method for the post-honing cleaning and lubrication of a cylinder of a reciprocating engine prior to assembly of said engine, said method comprising:

cleaning said cylinder with a solution of water containing a wetting agent in an effort to remove contaminants from said cylinder;

cleaning said cylinder with a solvent in a further effort to remove said contaminants from said cylinder;

lubricating said cylinder with a penetrating oil;

coating an inner surface of said cylinder with a powdered indicating lubricant formed of a mixture of tungsten disulfide and graphite, wherein said indicating lubricant is configured to assume a greenish tint when said contaminants have been substantially removed from said cylinder, and to refrain from assuming said greenish tint when said contaminants have not been substantially removed from said cylinder;

repeating said solution-cleaning, solvent-cleaning, lubricating, and coating activities when said indicating lubricant has refrained from assuming said greenish tint; and allowing assembly of said engine to proceed when said indicating lubricant has assumed said greenish tint.

* * * * *